United States Patent
Cha

(10) Patent No.: US 7,944,917 B2
(45) Date of Patent: May 17, 2011

(54) HOST DEVICE INTERFACING WITH A POINT OF DEPLOYMENT (POD) AND A METHOD OF PROCESSING BROADCAST DATA

(75) Inventor: Sang Hoon Cha, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 12/219,857

(22) Filed: Jul. 29, 2008

(65) Prior Publication Data

US 2009/0080430 A1 Mar. 26, 2009

Related U.S. Application Data

(60) Provisional application No. 60/952,846, filed on Jul. 30, 2007.

(30) Foreign Application Priority Data

Sep. 21, 2007 (KR) ........................ 10-2007-0096466

(51) Int. Cl.
*H04L 12/28* (2006.01)
(52) U.S. Cl. ........................................ 370/389; 370/474
(58) Field of Classification Search .................. 370/392, 370/389, 474, 235; 725/100, 114, 118, 131, 725/139, 31
See application file for complete search history.

(56) References Cited

U.S. PATENT DOCUMENTS

| | | | |
|---|---|---|---|
| 2002/0101991 A1* | 8/2002 | Bacon et al. ............... | 380/212 |
| 2005/0177845 A1 | 8/2005 | Patariu et al. | |
| 2006/0130110 A1* | 6/2006 | Cho et al. ................ | 725/111 |
| 2007/0008435 A1* | 1/2007 | Sung ........................ | 348/729 |
| 2007/0074256 A1 | 3/2007 | Jung et al. | |
| 2007/0133541 A1* | 6/2007 | Jung et al. ............... | 370/392 |

FOREIGN PATENT DOCUMENTS

EP 1748645 1/2007

OTHER PUBLICATIONS

CableCARD Interface 2.0 Specification, Jan. 5, 2007, CableLabs, covers and 1-299.*
"Opencable Specifications—Multi-Stream CableCARD Interface", 20050331 (2005), XP002507410, Chap. 1, pp. 1-3; Chap. 3, pp. 10-15, 22-25, 81-82, 122.
Joon-Yyoung Jung, et al.: "Design and Implementation of a High-Speed Descrambling Engine for Multi-stream CableCARD", IEEE Translations on consumer Electronics, vol. 53, No. 1 (2007), pp. 166-171, XP011175938.

* cited by examiner

*Primary Examiner* — Jung Park
*Assistant Examiner* — Jayanti K Patel
(74) *Attorney, Agent, or Firm* — McKenna Long & Aldridge LLP

(57) ABSTRACT

A host device interfacing with a point of deployment (POD) and a method of processing a broadcasting data are disclosed. An IP physical interface unit receives a frame including an internet protocol (IP) packet carrying broadcast data through a network modem. A Routing Engine transforms the frame to an IP packet and routs the IP packet based on a destination information included in the frame. And a Multiplexer generates an IP MPEG packet by appending a Packet Header carrying identification information to the IP packet, multiplexes the IP MPEG packet and forwards the multiplexed IP packet to the POD.

12 Claims, 8 Drawing Sheets

FIG. 3

| Ethernet Header (14 bytes) | IP Header (20 bytes) | UDP Header (8 bytes) | UDP Payload | Ethernet CRC |
|---|---|---|---|---|

FIG. 4

| IP Header (20 bytes) | UDP Header (8 bytes) | MPEG-TS (188 bytes) |
|---|---|---|

FIG. 5

| Routing Index | LTSID | Routing Dest. | Format |
|---|---|---|---|
| QAM Cable Index 1 | 1 | Decoder | MPEG TS |
| QAM Cable Index 2 | 2 | Flash | MPEG TS |
| IP Index 1 | 3 | Decoder | MPEG TS |
| IP Index 2 | 4 | HDD | MPEG TS over IP |

US 7,944,917 B2

HOST DEVICE INTERFACING WITH A POINT OF DEPLOYMENT (POD) AND A METHOD OF PROCESSING BROADCAST DATA

This application claims the benefit of U.S. Provisional Application No. 60/952,846, filed on Jul. 30, 2007 which is hereby incorporated by reference as if fully set forth herein. Also this application claims the benefit of Korean Patent Application No. 10-2007-96466, filed on Sep. 21, 2007 which is hereby incorporated by reference as if fully set forth herein.

BACKGROUND OF THE INVENTION

1. Field of the Invention

The present invention relates to a host device interfacing with a Point Of Deployment (POD) and a method of processing broadcast data, and more particularly, to a host device for processing broadcast data transmitted on the basis of an Internet protocol (IP) and a method of processing broadcast data transmitted on the basis of an Internet protocol (IP).

2. Discussion of the Related Art

Existing television (TV) services have been provided in such a manner that contents produced by broadcasting companies are transmitted through radio transmission media, such as terrestrial waves, cables or satellites, and a viewer watches the transmitted contents through a TV receiver capable of receiving the transmitted contents via the respective transmission media.

However, as digital TV technologies based on digital broadcasting are developed and are commercially available, breaking from existing analog broadcasting, various contents, such as real-time broadcasts, Contents on Demand (CoD), games and news, can be provided to a viewer using the Internet network connected to each home, besides the existing transmission media.

An example of the provision of contents using the Internet network may include an Internet Protocol TV (IPTV). The IPTV indicates a broadcast receiver for receiving various types of information services, moving-image contents and broadcasts using an Internet network and displaying them to a user. The Internet network can be implemented on the basis of various types of networks such as optical cable networks, coaxial cable networks, fiber-to-the-home (FTTH), telephone networks and wireless networks.

The service using the Internet network additionally has bidirectionality and enables a viewer to watch a desired program at his/her convenient time, unlike general terrestrial broadcasting.

SUMMARY OF THE INVENTION

Accordingly, the present invention is directed to a host device interfacing with a point of deployment (POD) and a data processing method for use in the host device that substantially obviate one or more problems due to limitations and disadvantages of the related art.

An object of the present invention is to provide a host device interfacing with a point of deployment (POD) which can process data received via the Internet, and a data processing method for use in the host device.

Another object of the present invention is to provide a host device interfacing with a point of deployment (POD) which can process broadcast data, received from all the Tx protocols including both a wired/wireless network and an IP protocol, using a conditional access provided from a conventional cable card, and a data processing method for use in the host device.

Another object of the present invention is to provide a host device interfacing with a point of deployment (POD) which can receive broadcast data from a Multimedia over Coax Alliance (MoCA), and a data processing method for use in the host device.

Another object of the present invention is to provide a host device interfacing with a point of deployment (POD) which can process Inband data received over the Internet, and a data processing method for use in the host device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing broadcast data includes receiving a frame including an internet protocol (IP) packet through a network; transforming the frame to an IP packet and routing the IP packet based on a destination information included in the frame; adding a Packet Header carrying identification information to the IP packet; and multiplexing the IP packet including the Packet Header and sending the multiplexed IP packet to a point of deployment (POD). Herein the destination information is at least one of a MAC address, an IP address and a port number. And the identification information is a local transport stream ID (LTSID). And the IP packet carries at least one of a video, an audio and a service information.

Also, the frame is an Ethernet frame including an Ethernet header, an IP packet and an Ethernet CRC. Herein, transforming the frame to an IP packet includes removing the Ethernet header and the Ethernet CRC from the frame.

Also adding a Packet Header includes determining the identification information with respect to the IP packet. Herein, the identification information is determines based on at least one of an IP address and a Port number included in the IP packet.

In another aspect of the present invention, a method of processing broadcast data includes receiving a frame including an internet protocol (IP) packet through a network and a MPEG transport packet through a cable; transforming the frame to an IP packet and routing the IP packet based on a destination information included in the frame; demodulating the MPEG transport packet; generating an IP MPEG packet and a CableCARD MPEG packet by appending a Packet Header carrying identification information to each of the IP packet and the demodulated MPEG transport packet; and multiplexing the IP MPEG packet and the CableCARD MPEG packet and sending the multiplexed IP MPEG packet and CableCARD MPEG packet to a point of deployment (POD). Herein the IP packet carries at least one of a video, an audio and a service information.

Also, the method further includes receiving the IP MPEG packet and CableCARD MPEG packet from the POD; and demultiplexing the received IP MPEG packet and CableCARD MPEG packet based on the identification information.

In another aspect of the present invention, a host device interfacing with a point of deployment (POD) includes an IP physical interface unit for receiving a frame including an internet protocol (IP) packet through a network; a routing engine for transforming the frame to an IP packet and routing the IP packet based on a destination information included in the frame; and a multiplexer for generating an IP MPEG packet by appending a Packet Header carrying identification information to an IP packet, multiplexing the IP MPEG packet and sending the multiplexed IP packet to the POD. Herein, the destination information is at lest of a MAC address, an IP address and a port number. And the identification information is a local transport stream ID (LTSID). And the IP packet carries at least one of a video, an audio and a service information.

Also, the frame is an Ethernet frame including an Ethernet header, an IP packet and an Ethernet CRC. Herein the routing engine removes the Ethernet header and the Ethernet CRC from the frame.

Also, the multiplexer determines the identification information with respect to each of the IP packet. Herein, the multiplexer determines the identification information based on at least one of an IP address and a Port number included in each IP packet.

Also, the host device further comprises includes a broadband interface unit for receiving a MPEG transport packet through a cable. a demodulator for demodulating the received MPEG transport packet. Herein, the multiplexer generates a CableCARD MPEG packet by appending a Packet Header carrying identification information to the demodulated MPEG transport packet, multiplexing the IP MPEG packet and the CableCARD MPEG packet and sending the multiplexed IP MPEG packet and CableCARD MPEG packet to the POD.

Also, the host device further includes a demultiplexer for receiving the IP MPEG packet and the CableCARD MPEG packet from the POD and demultiplexing the received IP MPEG packet and CableCARD MPEG packet based on the identification information.

Therefore, the present invention can perform content protection using the conditional access provided from the conventional cable card. Therefore, the service provider or the service enterpriser can perform the above content protection, and can stably charges a usage fee to a service user using the conditional access.

The present invention processes broadcast data received from all the transfer protocols including both the wired/wireless network and the IP protocol, such that it interfaces with the openCable security card. A service subscriber or a service user minimally changes or extends a function of the conventional cable security card, such that the subscriber or user is able to view data of a desired service provider.

The present invention allows Inband data, transmitted on all the transfer protocols including the wired/wireless network and the IP protocol, to maintain the IP packet format, such that IP-packet format Inband data is transmitted to the security card. As a result, the host can effectively communicate with the security card.

The present invention maintains the interface of the Inband interface of the conventional openCable card, such that it can support both the Inband data received over the Internet or other Inband data received over other Inband channels. As a result, the present invention can acquire a backward compatibility with a conventional system.

The present invention can receive broadcast data from a multimedia over Coax Alliance (MoCA), such that an seamless IP-based connectivity can be implemented on a coaxial network, resulting in the implementation of an IP over Coax.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a structural diagram illustrating an Ethernet frame according to one embodiment of the present invention;

FIG. 4 is a structural diagram illustrating data routed to a multiplexer according to one embodiment of the present invention;

FIG. 5 is a structural diagram illustrating a Local Transport Stream ID (LTSID) table according to one embodiment of the present invention;

DETAILED DESCRIPTION OF THE INVENTION

Figure 1:
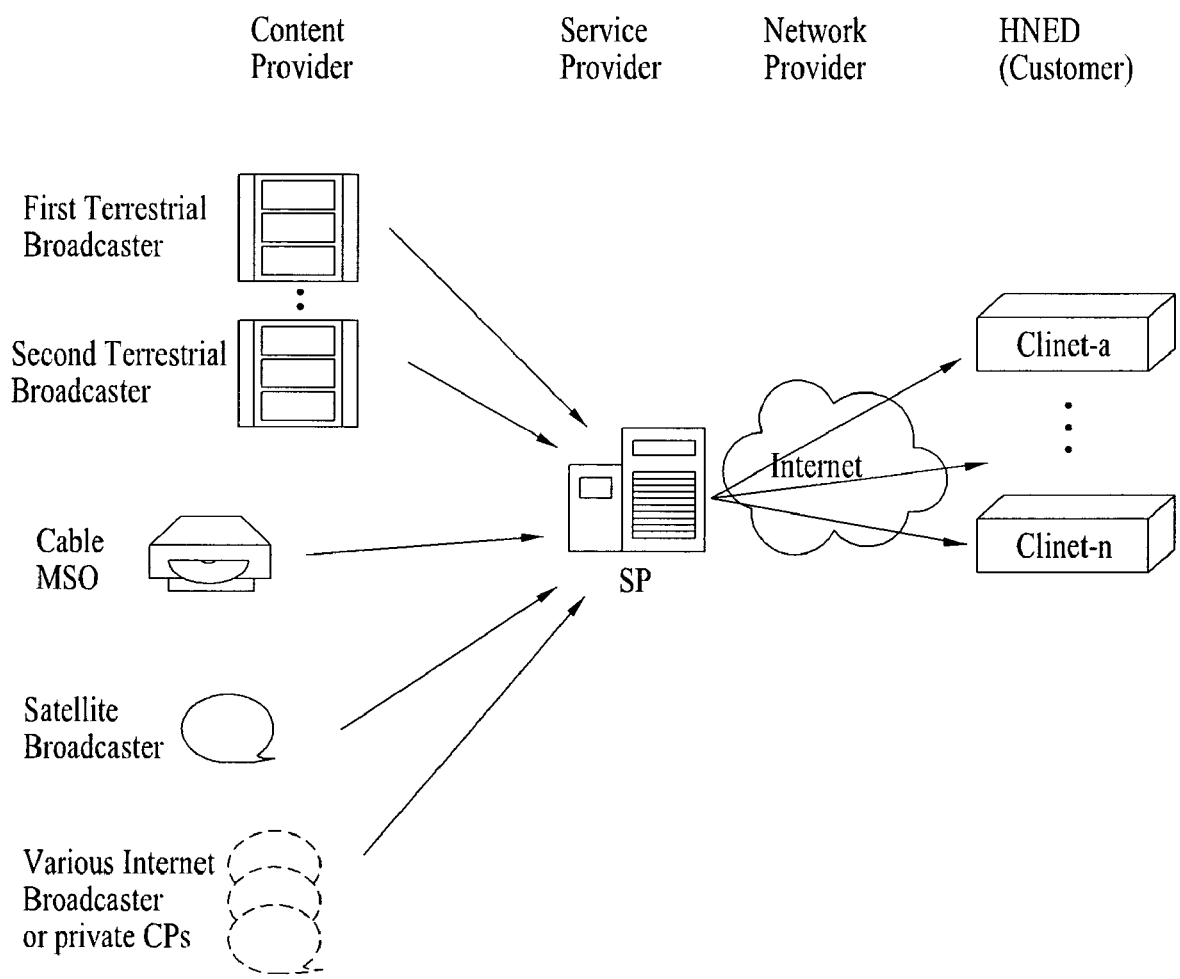
FIG. 1 is a conceptual diagram illustrating an IPTV system according to one embodiment of the present invention.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A broadcast receiver and a method of processing broadcast data according to the present invention will be described in detail with reference to the accompanying drawings.

An Internet protocol TV (IPTV) system which is an example of a system capable of providing various types of contents using an Internet network may be largely divided into a server, a network and a broadcast receiver (client).

The server of the IPTV system may include servers having various functions, such as a service discovery and selection server, a streaming server, a content guide information server, a customer information server, and a payment information server.

Among these servers, the streaming server transmits stored Moving Picture Experts Group (MPEG)-2 or MPEG-4 encoding moving-image data to the broadcast receiver via a network. As a transmission protocol, a real-time transport protocol (RTP) or a RTP control protocol (RTCP) may be used.

In the case where a real-time streaming protocol (RTSP) is used, the reproduction of a moving-image stream can be controlled by a network trick play function such as Pause, Replay, Stop or the like to some extent.

The content guide information server provides information on provided various contents. The content guide information includes a variety of information on the contents as information corresponding to electronic program guide (EPG) information. The content guide information server stores content guide information data and provides the stored data to the broadcast receiver.

Among the servers, the service discovery and selection server provides access information of servers for providing various types of content services such as broadcasts, Contents on Demand (CoD) or games and reproduction information to the broadcast receiver.

A network system includes an Internet-based network and gateways. As the Internet-based network, various types of networks based on the IP, such as optical cable networks, coaxial cable networks, fiber-to-the-home (FTTH), telephone networks and wireless networks, may be used. The gateways may generally perform data delivery, multicast group management using a protocol such as an Internet Group Management Protocol (IGMP) and Quality of Service (QoS) management.

The IPTV indicates a broadcast receiver capable of receiving data transmitted via the Internet network and providing the data to a user. The broadcast receiver may include an IPTV settop, a homenet gateway and an IPTV embedded TV.

A hybrid IPTV system can provide various types of contents of the Internet as well as various types of existing broadcast contents. That is, besides various types of broadcast contents such as terrestrial broadcasting, cable broadcasting, satellite broadcasting or private broadcasting, various Internet image contents or data contents other than images can be provided to the user. These contents may be provided in real time or on demand.

FIG. 1 is a schematic view showing an IPTV system according to an embodiment of the present invention.

From the viewpoint of a content service provider, the IPTV system may be divided into a content provider (CP), a service provider (SP), a network provider (NP) and a user.

The CP manufactures and provides various types of contents. The CP may include a terrestrial broadcaster, a cable system operator (SO) or a cable multiple system operator (MSO), a satellite broadcaster and an Internet broadcaster.

The SP packages contents provided by the CP to a service and provides the service. For example, the SP of FIG. 1 packages a first terrestrial broadcast, a second terrestrial broadcast, a cable MSO broadcast, a satellite broadcast, various Internet broadcasts to the service and provides the service to the user.

As means for protecting the contents transmitted in the IPTV system, conditional access or content protection may be used. As an example of the conditional access or the content protection, a cable card or a downloadable conditional access system (DCAS) may be used.

The use of the security card or the DCAS is selected by the SP for providing the IPTV service. In the case where the security card or the DCAS is used in the broadcast receiver, the SP communicating with the broadcast receiver should use that system.

Figure 2:
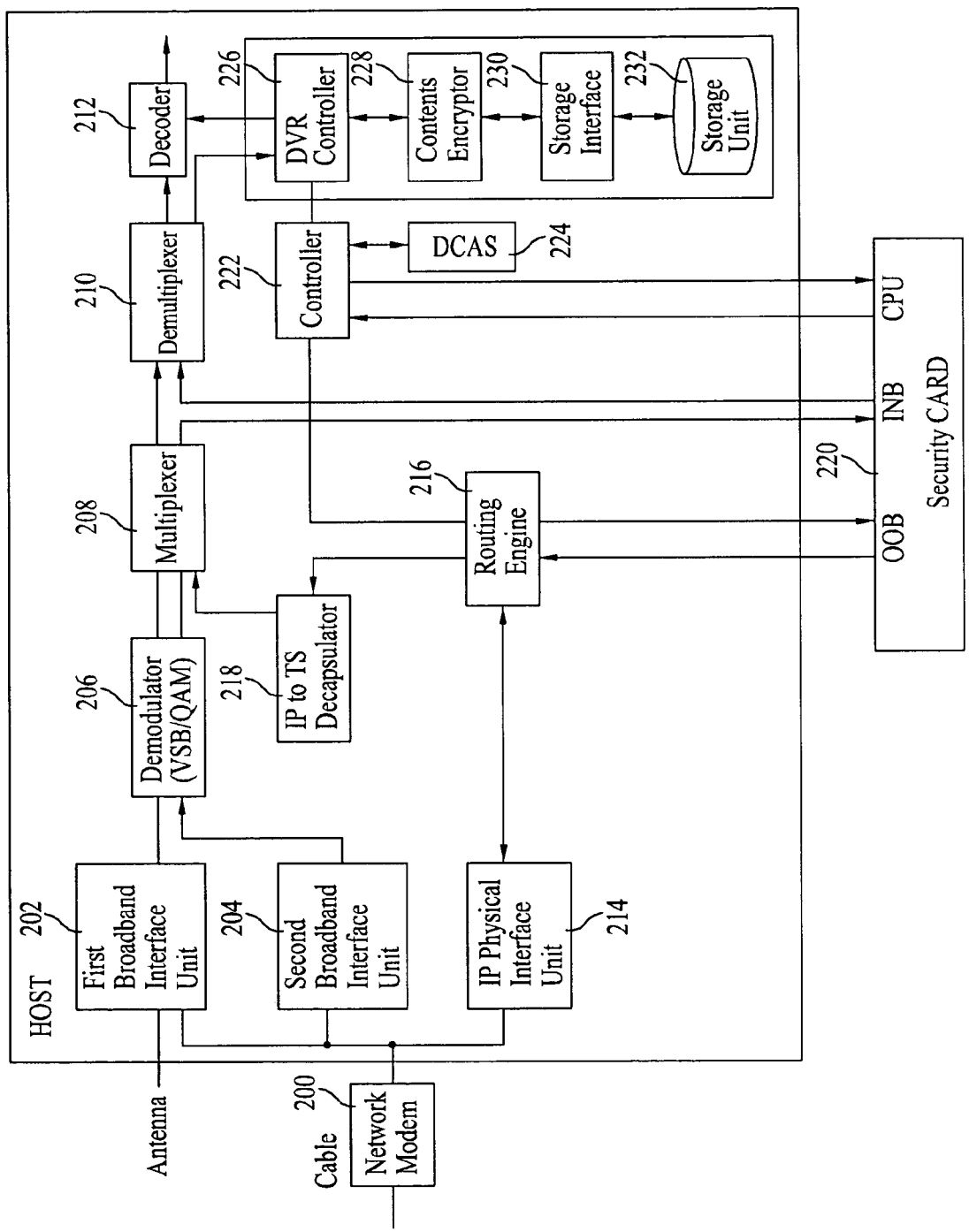
FIG. 2 is a block diagram illustrating a receiver for use of a cable card according to one embodiment of the present invention.

FIG. 2 is a schematic block diagram showing a broadcast receiver using the security card according to an embodiment of the present invention.

The broadcast receiver of FIG. 2 can receive all of an IPTV service based on the IP, a cable broadcast, a terrestrial broadcast and a satellite broadcast. The broadcast receiver of FIG. 2 may receive only the IPTV service or cable broadcasting according to the implementation examples. The security card of FIG. 2 may be called other terms according to the implementation examples.

The receiver of FIG. 2 mainly includes a host and a security card. The host includes a first broadband interface unit 202, a second broadband interface unit 204, a demodulator 206, a multiplexer 208, a demultiplexer 210, a decoder 212, an IP physical interface unit 214, a routing engine 216, a controller 218, a Downloadable CAS (DCAS) unit 222, a Digital Video Recorder (DVR) controller 224, a contents encryptor 226, a storage interface unit 228, and a storage unit 230.

The broadcast receiver is an open cable type receiver in which the security card including a conditional access system (CAS) can be detached from a main body. The security card is also called a point of deployment (POD) module, which is inserted into or detached from a slot of the main body of the broadcast receiver. The main body into which the security card is inserted is also called a host device. That is, a combination of the security card and the host device is called the broadcast receiver.

The host device included in the broadcast receiver of FIG. 2 is one example implemented by a multi stream host device capable of simultaneously processing a plurality of streams. When a host device is implemented by a single stream host device capable of processing only one stream, it is bypassed for multiplexer 208 and the demultiplexer 210 of the host device of FIG. 2 to generate a CableCard MPEG Packet (CMP) and an IP MPEG Pacek (IMP) by appending a Packet Header to a MPEG transport packet and multiplex the CMP and the IMP and demultiplex the multiplexed CMP and IMP. But, though a host device is implemented a single stream host device, the other operations that the present invention disclose are performed identically. Also, the single-stream card capable of processing only one stream may be used as the security card 220, or the multi-stream card capable of simultaneously processing several streams may also be used as the security card 220.

A network modem 200 connects an external network and the broadcast receiver. For example, the broadcast receiver may be connected to the external network using a data over cable service interface specification (DOCSIS) modem, a wireless repeater connected to a wireless Internet network, or a wired repeater connected to a wired Internet network, such as a wired Asymmetric Digital Subscriber Line (ADSL) repeater. The example of the connection between the broadcast receiver and the external network is only exemplary and may vary depending on how the broadcast receiver is connected to the external network.

In the case where the network modem 200 is implemented by the DOCSIS modem, the broadcast receiver according to the present invention may be connected to a DOCSIS network. That is, the network modem 200 may build a cable modem termination system (CMTS) (DSG agent) and a DSG tunnel for delivering a data broadcast received from a set-top controller (DSG server) via the DOCSIS network and receive broadcast data via the built DSG tunnel. Here, the DOCSIS network may be implemented by an IP backbone network and support IP multicast/unicast.

However, in order to support the IP multicast/unicast via the DOCSIS network, a packet received from the CMTS (DSG agent) should be transformed to a DSG packet and the DSC packet should be transmitted. Accordingly, the broadcast receiver cannot be directly connected to the external IP network so as to receive the broadcast data.

In order to solve these problems, the network modem 200 may provide a function for directly connecting the broadcast receiver to the external IP network. For example, the network modem 200 may be implemented by a Multimedia over Coax Alliance (MoCA). In the case where the network modem 200 is implemented by the MoCA, the IP-based network may be established and connected over a coaxial cable network. That is, in the case where the network modem 200 is implemented by the MoCA, the DOCSIS may not be used, the DOCSIS modem does not need to be used, and the CMTS connected to the DOCSIS modem over the network does not need to be used. In addition, the DSG tunnel established between the DOCSIS modem and the CMTS does not need to be used. Accordingly, since seamless IP-based connectivity may be implemented over the coaxial network, the broadcast receiver according to the present invention can use IP over Coax and thus provide a rapid stable broadcast service to the user.

The first broadband interface unit 202 tunes to only a specific channel frequency of terrestrial audio/video (A/V) broadcasting transmitted via an antenna or cable A/V broadcasting transmitted in-band via a cable connected to the network modem 200, and outputs the tuned signal to the demodulator 206.

At this time, since the terrestrial broadcast and the cable broadcast are transmitted by different transmission methods, they are demodulated by different demodulation methods in the demodulator 206. For example, while the terrestrial A/V broadcast is modulated by a vestigial sideband modulation (VSB) method, the cable A/V broadcast is modulated by a quadrature amplitude modulation (QAM) method. Therefore, if the channel frequency tuned by the first broadband interface unit 202 is the terrestrial broadcast, the demodulator 206 demodulates the terrestrial broadcast by the VSB method and if the channel frequency tuned by the first broadband interface unit 202 is the cable broadcast, demodulates the cable broadcast by the QAM method.

The second broadband interface unit 204 tunes to only a specific channel frequency of cable A/V broadcast transmitted in-band via the cable connected to the network modem 200, and outputs the tuned signal to the demodulator 206.

The first broadband interface unit 202 and the second broadband interface unit 204 may tune the signals of different channels and transmit the signals to the demodulator 206. Alternatively, the first broadband interface unit 202 and the second broadband interface unit 204 may tune different A/V streams of the same channel and transmit the signals to the demodulator 206. For example, the first broadband interface unit 202 may tune a stream of a main picture and the second broadband interface unit 204 may tune a stream of a picture in picture (PIP). In the case where a digital video signal is stored in a digital video recorder (DVR), the video signal may be watched and recorded using the first broadband interface unit 202 and the second broadband interface unit 204.

The demodulator 206 demodulates the received signal and transmits the demodulated signal to the multiplexer 208. For example, an MPEG TS (Transport Stream) stream which is encoded by an MPEG encoding scheme (e.g., MPEG 2 or MPEG 4) is transmitted to the multiplexer 208. Or a stream which is encoded by other encoding schemes is transmitted to the multiplexer 208. the received signal is different according to the encoding schemes by which the received signal is encoded.

IP physical interface unit 214 acts as a network interface unit. The IP physical interface unit 214 receives an Ethernet frame packet transmitted to a specific IP address from among addresses received via the network modem 200, and transmits the received Ethernet frame packet to the routing engine 216. Otherwise, the IP physical interface unit receives bi-directional data (e.g., pay-per-view program application, receiver status information, and user input information) from the routing engine 216, and transmits the received bi-directional data to an external network via the network modem 200. The IP address may be an IP address of a host or an IP address of a security card.

The receiver of FIG. 2 may receive IP protocol-based OOB (Out Of Band) message data or Inband data including audio, video, and data broadcast data from the IP physical interface unit 214.

The conventional cable broadcasting system receives OOB data using a DOCSIS Settop Gateway (DSG) or OOB scheme, for example, System Information (SI), Emergency Alert System (EAS), extended Application Information Table (XAIT), conditional access system information, and various security card control information.

A host of the receiver of FIG. 2 may include a DOCSIS modem or an OOB tuner, such that it may receive the OOB data. For example, the receiver may receive the OOB data using one of the IP scheme and the OON scheme. Otherwise, the receiver may receive the OOB data using one of the IP scheme, the DSG scheme, and the OOB scheme.

If the receiver selects one of the IP scheme and the OOB scheme and receives OOB data under the selected scheme, the receiver of FIG. 2 further requires the OOB tuner and the demodulator. If the receiver of FIG. 2 receives one of the IP scheme, the DSG scheme and the OOB scheme, and receives OOB data under the selected scheme, the receiver further requires the DOCSIC modem, the OOB tuner, the switching unit for selecting the DSG or OOB scheme, and the demodulator for transmitting data to the headend or the service provider according to individual schemes. If there are a plurality of schemes, the headend determines which one of schemes will be used, and transmits the determined result to the security card. The security card transmits the received operation scheme information to the host.

For the convenience of description, the path and block of the DSG scheme of the DOCSIS modem or the path and block of the OOB scheme of the OOB tuner are omitted from the receiver of FIG. 2.

The routing engine 216 routes each Rx packet to a destination of the Rx packet. For example, the routing engine 216 may route the packet the above packet to the destination using a TCP/IP (Transmission Control Protocol/Internet Protocol)-based network stack. The routing engine 216 can support both the TCP/IP protocol and the UDP (User Datagram Protocol)/IP protocol. Also, the routing engine 216 may discriminate between Inband data and OOB data using packet header information, and may perform jitter filtering.

FIG. 3 is a structural diagram illustrating an Ethernet frame according to one embodiment of the present invention. The routing engine 216 receives the Ethernet frame having the structure of FIG. 3. The frame includes an Ethernet header of 14 bytes, an IP header of 20 bytes, a UDP header of 8 bytes, a payload, and an Ethernet CRC (Cyclic Redundancy Check). If data is transmitted according to the TCP protocol instead of the UDP protocol, a TCP header may be used instead of the UDP header, and a TCP payload on behalf of the UDP header may be contained in the Ethernet frame, such that the above-mentioned payload may include Inband data or OOB data.

The routing engine 216 divides the Rx data of FIG. 3 into the Inband data and the OOB data, and performs routing of the inband and OOB data. In order to distinguish the Inband data from the OOB data, the routing engine 216 may use the header information made by an agreement between a transmission end and a reception end. The Inband data and the OOB data may be routed to a data destination using a second layer routing, a third layer routing, or a fourth layer routing.

In the case of using the second layer routing, the routing engine 216 performs the routing using a destination Media Access Control (MAC) address contained in an Ethernet header of the received Ethernet frame. In the case of using the third layer routing, the routing engine 216 performs the routing using the destination IP address contained in the IP header of the received Ethernet frame. In the case of using the fourth layer routing, the routing engine 216 performs the routing using the destination port contained in the UDP header of the received Ethernet frame. If the Ethernet frame includes the TCP header, the routing engine 216 performs the routing using the destination TCP port. The routing engine 216 may determine whether to use the second layer routing, the third layer routing, or the fourth layer routing according to individual implementation examples. In other words, the routing engine 216 may use the second layer routing, the third layer routing, or the fourth layer routing according to individual implementation examples.

For example, in the case of using the second layer routing, the Ethernet header of host's data contained in the Rx data includes MAC address information. In the case of using the third layer routing, the IP address of host's data contained in the Rx data includes host's IP address information. In the case of using the fourth layer routing, a UDP header or a TCP header of host's data contained in the Rx data includes a port number.

In the Rx data of the routing engine 216, Inband data including audio-, video-, and data broadcast-data is routed to the IP-to-TS decapsulator 218. The Inband data may be an MPEG TS stream encoded by an MPEG encoding scheme (e.g., MPEG 2 or MPEG 4). The Inband data may be a stream encoded by other encoding schemes.

FIG. 4 is a structural diagram illustrating data routed to the multiplexer 208 according to one embodiment of the present invention. The data structure of FIG. 4 may include a payload and an MPEG-TS encoded by the MPEG scheme. The routing engine 216 transmits data other than both the Ethernet header and the Ethernet CRC in the received Ethernet frame to the multiplexer 208. Data having the data structure of FIG. 4 will hereinafter be referred to as an IP packet. According to host implementation examples, the IP packet including A/V data of several channels can be simultaneously received. Therefore, the multiplexer 208 assigns the LTSID to each data contained in IP packets of different channels, and multiplexes the resultant data. In this case, the LTSID is indicative of identification information for identifying corresponding stream data. For example, if the multiplexer 208 receives the IP packet of FIG. 4, the LTSID mapped to each MPEG-TS may be assigned to the received IP packet using the routing index information engaged with either a server for data transmission or a headend. The security card classifies data using the above-mentioned LTSID, and may perform CA descrambling of the classified data. The host can correctly route data using the LTSID. In this case, the routing index information may be received via the server or the headend. Also, the routing index information may include an IP address list or a port list, and may also include another list associated with the IP address and associated ports.

FIG. 5 is a structural diagram illustrating a Local Transport Stream ID (LTSID) table according to one embodiment of the present invention. Based on the LTSID table of FIG. 5, the present invention can simultaneously discriminate between the IP packet data of each Rx channel based on the IP and the Inband data of a cable broadcast channel. Also, the present invention can generate and modify the above-mentioned LTSID table using the routing index information.

Referring to FIG. 5, QAM Cable index may be used to discriminate the A/V data stream received over a quadrature amplitude modulation (QAM) channel of the cable broadcast channel. For example, if the receiver can receive data of several cable broadcast channels via several tuners, it may assign the LTSID to each tuner. As shown in FIG. 2, in order to identify the A/V data stream received in the first broadband interface unit 202, the QAM Cable index 1 (LTSID 1) may be assigned. In order to identify the A/V data stream received in the second broadband interface unit 204, QAM Cable index 2 (LTSID 2) may be assigned.

The IP index may be used to identify the IP packet data corresponding to each channel data received via the IP network channel. In order to identify the above IP packet data, a variety of methods for assigning the LTSID can be used. In this case, the IP index can be calculated from the routing index information.

Firstly, the receiver may assign the LTSID using the IP address information contained in the IP header of the IP packet received in the multiplexer 208. In other words, if several IP addresses are used as the IP index, different LTSIDs may be assigned to the IP addresses. Therefore, the receiver may discriminate Rx data for each IP address. For example, the IP index 1 (LTSID 3) may be assigned to the IP packet received at the IP address (1.1.1.1) of the receiver, and the IP index 2 (LTSID 4) may be assigned to the IP packet received at another IP address (1.1.1.2) of the receiver. IPv4, IPv6, etc., can be applied to the IP address. The above-mentioned IP address has been used as an example only. However, information contained the IP header of either the frame or the packet may be changed according to the above IP address. In this case, the multiplexer 208 may set each IP address contained in the routing index information to the IP index, and assigns the LTSID to each IP address, such that the table of FIG. 4 can be generated and modified.

Secondly, the receiver may assign the LTSID using the port information contained in the UDP (or TCP) header of the IP packet received in the multiplexer 208. In other words, if several ports are used as the IP index, different LTSIDs may be assigned to the individual ports. Therefore, the receiver may discriminate Rx data for each port. For example, the IP index 1 (LTSID 3) may be assigned to the IP packet received at the No. 6 port of the receiver, and the IP index 2 (LTSID 4) may be assigned to the IP packet received at the No. 17 port of the receiver. The above-mentioned port number has been used as an example only. In this case, the multiplexer 208 may set each port contained in the routing index information to the IP index, and assigns the LTSID to each port, such that the table of FIG. 5 can be generated and modified.

Thirdly, the receiver may assign the LTSID using not only the IP address contained in the IP header of the IP packet received in the multiplexer 208, but also the port information contained in the UDP (or TCP) header. In other words, the IP index may include at least one of the IP address and its associated port. The receiver may assign the LTSID using the IP address and the port information. For example, the IP index 1 (LTSID 3) may be assigned to the No. 6 port-received IP packet from among all the IP packets received at the IP address (1.1.1.1), and the IP index 2 (LTSID 4) may be assigned to the No. 17 port-received IP packet from among all the IP packets received at the IP address (1.1.1.1). The IP index 3 (LTSID 5: not shown) may be assigned to the No. 6 port-received IP packet from among all the IP packets received at the IP address (1.1.1.2). In this case, the multiplexer 208 may set each IP address contained in the routing index information and a port associated with the IP address to the IP index, and assigns the LTSID to each IP address and port, such that the table of FIG. 5 can be generated and modified.

The routing destination (Routing Dest) of the LTSID table is indicative of a routing destination of the above data after the demultiplexing has been carried out by the demultiplexer 210. 'Format' of the LTSID table is indicative of a data format received at the destination when the demultiplexed data of the demultiplexer 210 is routed. For example, if data has the LTSID value of 1, this data is demultiplexed by the demultiplexer 210, and the demultiplexed data is routed to the decoder. The data format routed to the decoder is an MPEG-TS format. If data has the LTSID value of 4, this data is demultiplexed by the demultiplexer 210, and the demultiplexed data is routed to a storage unit (e.g., HDD). The aforementioned routing data format is configured in the form of an IP packet to which the IP header is added to the MPEG-TS as shown in FIG. 4.

The above LTSID table may be generated after the host has been initially booted. When the above LTSID table is generated, individual items of the above table (e.g., the destination information or the format information) may have default values, respectively. Although the host is powered off, the above table can maintain the default values. For this operation, the above-mentioned values may be stored in the storage unit 230 acting as a non-volatile memory of the host. The routing destination information or the format information can be changed to another by user's setup information at a predetermined time after the host has been booted. That is, the above-mentioned information may be changed to another according to a variety of setup conditions.

The multiplexer 208 inserts the LTSID into Rx data of both the demodulator 206 and the routing engine 216. The Rx data may be multiplexed and the multiplexed data may be outputted. For example, the multiplexer 208 multiplexes a main image and a PIP image, and outputs the multiplexed resultant image. In this case, the main image is tuned by the first broadband interface unit 202, and the tuned resultant image is demodulated. The PIP image is tuned by the second broadband interface unit 204, and the tuned resultant image is demodulated. Otherwise, according to implementation examples, the above-mentioned multiplexed result may be multiplexed with the output signal of the routing engine 216, such that the resultant image may be generated from the multiplexer 208. If the MPEG2-based encoded data is received in the receiver via the tuner, the multiplexer 208 receives MPEG-TS data. If the IP-based encoded data is received in the receiver via the IP physical interface unit (NIC) 214, the multiplexer 208 receives the IP packet.

If the security card of the receiver is equal to the S-CARD capable of supporting a single stream, the host transmits Rx data to the security card without any change. Therefore, the multiplexer 208 or the demultiplexer 210 of FIG. 2 need not make an IMP or a CMP by attaching a local header to Rx data, and need not multiplex or demultiplex the IMP or the CMP. In other words, the multiplexing or demultiplexing process of the multiplexer 208 or the demultiplexer 210 shown in FIG. 2 is bypassed. However, although the single-stream host is used, other operations of the present invention can also be carried out in the same manner as in the multi-stream host. However, if the security card is an M-CARD capable of supporting the multi-stream, there is needed a process for multiplexing several stream data or demultiplexing the multiplexed resultant data. The above-mentioned multiplexing process adds a pre-header of 12 bytes to the stream data, and then multiplexes the resultant data. The pre-header is removed from the demultiplexing process.

The receiver of FIG. 2 is used when the M-CARD for supporting the multi-stream is used. Therefore, if the multiplexer 208 receives data, it adds the pre-header to the received data, multiplexes the resultant data, and outputs the multiplexed result. Rx data of the demodulator 206 is difference from that of the routing engine 216. For example, the MPEG-TS data may be received in the demodulator 206. The IP-packet data of FIG. 4 may be received from the routing engine 216.

The multiplexer 208 discriminates the received data, adds the pre-header to the resultant data, and outputs the added result. For example, if the demodulator 206 receives the MPEG-TS data, the multiplexer 208 adds the pre-header of 12 bytes to the MPEG-TS data, and multiplexes the added result. If data of the IP packet format is received in the routing engine 216, the multiplexer 208 adds the pre-header of 12 bytes to the IP packet format data, and multiplexes the added result. For the convenience of description, if a specific packet is constructed by adding the pre-header to the MPEG-TS, this specific packet is called a CableCard MPEG Packet (CMP). If a specific packet is constructed by adding the pre-header to the IP packet data, this specific packet is called an IP MPEG Packet (IMP). The above-mentioned terms have been disclosed for only illustrative purposes, and the scope and spirit of the present invention is not limited to only the above terms, but can also be applied to other examples as necessary.

Figure 6:
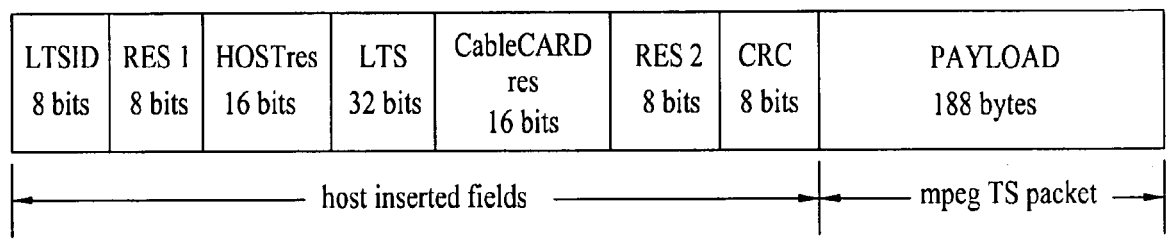
FIG. 6 is a structural diagram illustrating a CableCARD MPEG Packet (CMP) structure according to one embodiment of the present invention.
Figure 7:
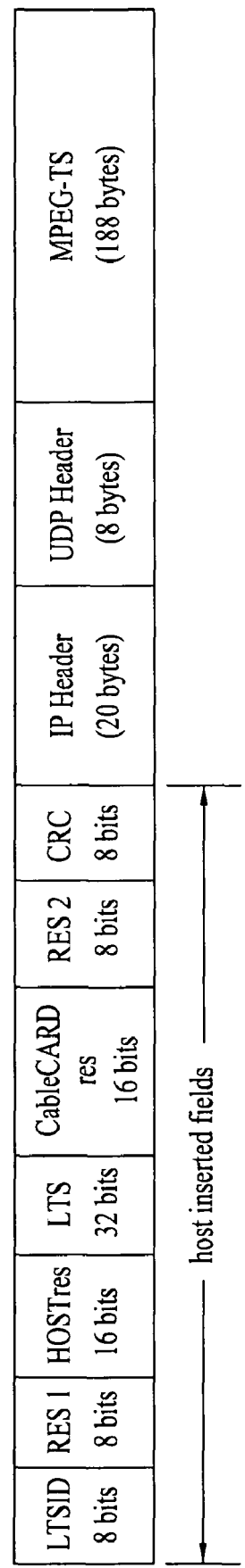
FIG. 7 is a structural diagram illustrating an IMP structure according to one embodiment of the present invention.

FIG. 6 is a structural diagram illustrating a CableCARD MPEG Packet (CMP) structure according to one embodiment of the present invention. FIG. 7 is a structural diagram illustrating an IMP structure according to one embodiment of the present invention. The CMP includes a pre-header of 12 bytes and a payload (MPEG-TS) of 188 bytes. The IMP structure includes a pre-header of 12 bytes, an IP header of 20 bytes, and a UDP (or TCP) header of 8 bytes, and a payload (MPEG-TS) of 188 bytes.

The pre-header of 12 bytes includes a Local Transport Stream ID (LTSID) area, reserved areas (Res1 and Res2), a host reserved area (HOSTres), a Local Time Stamp (LTS) area, a Security CARD reserved area (CableCardres), and a CRC area. The LTSID area may include the above-mentioned LTSID information. The host reserved area (HOSTres) may include additional packet characteristic information generated from the host. The LTS area includes local time stamp (LTS) information prescribed in the host. The host can manage the MPEG packet timing using the above-mentioned local time stamp (LTS) information. The security card reserved area (CableCardres) can be selectively used by the security card. The CRC area includes CRC information for correcting errors of the pre-header.

The multiplexer 208 outputs terrestrial broadcast data (i.e., data requiring no CA descrambling) to the demultiplexer 210. Other data requiring the CA descrambling (e.g., cable broadcast data or the IPTV Inband data) is transmitted to the security card 220. In this case, the multiplexer 208 may transmit the above CMP or IMP-packet-formatted data to the security card 220.

The security card 220 includes a conditional access (CA) system, such that the copy prevention and the conditional access of high value-added broadcast content data can be implemented. This security card 220 may also be called a point of deployment (POD). In other words, the security card 220 descrambles Rx broadcast data, and outputs the descrambled broadcast data to the demultiplexer 210. If the CMP or IMP packet is received in the security card 220, the security card 220 descrambles data (i.e., MPEG-TS) contained in the payload of the packet. If there is no security card 220, the CMP or IMP packet generated from the multiplexer 208 is directly transmitted to the demultiplexer 210. In this case, the scrambled broadcast data cannot be descrambled, such that a user is unable to normally view the above broadcast data.

The security card 220 descrambles the received CMP or IMP packet, and the CMP or IMP packet including the descrambled data is re-transmitted to the host.

The demultiplexer 210 receives the CMP or IMP packet, demultiplexes the packet data, and outputs the demultiplexed data. The demultiplexer 210 processes the demultiplexed data using the LTSID contained in the pre-header. For example, packet data having a specific LTSID may be transmitted to the decoder 212, such that that the decoder 212 decodes the received data. Packet data having another LTSID may be stored in the storage unit 230 using a Digital Video Recorder (DVR).

Upon receiving the CMP packet, the demultiplexer 210 removes the pre-header contained in the above packet, and processes data using the LTSID information contained in the pre-header. In other words, the demultiplexer 210 detects the routing destination information and the data format information, which are mapped to the LTSID contained in the above CMP packet, by referring to the LTSID table of FIG. 5. The above pre-header is removed according to the detected routing destination information, and the CMP packet having fabricated data is routed according to the detected format information. For example, the above pre-header is removed according to the above LTSID information, and data (e.g., MPEG-TS) contained in the payload can be outputted to the decoder 212. For another example, the pre-header is removed according to the LTSID information, and data contained in the payload may also be stored in the storage unit 230.

Upon receiving the IMP packet, the demultiplexer 210 removes the pre-header contained in the above packet, and processes data using the LTSID information. In other words, the demultiplexer 210 detects the routing destination information and the data format information, which are mapped to the LTSID contained in the above IMP packet, by referring to the LTSID table of FIG. 5. The above pre-header is removed according to the detected routing destination information, and the IMP packet having fabricated data is routed according to the detected format information. For example, the pre-header, the IP header, and the UDP (or TCP) header are removed from the above packet, and data (e.g., MPEG-TS) contained in the payload may be transmitted to the decoder 212. According to the above-mentioned LTSID information, the IP packet having no pre-header may be stored in the storage unit 230, or the payload data (MPEG-TS) having no pre-header, no IP header, and no UDP (or TCP) header may be stored in the storage unit 230.

The decoder 212 recovers the A/V signal compressed by both the video decoding algorithm and the audio decoding algorithm, and outputs the recovered A/V signal.

The DVR controller 224, the contents encryptor 226, the storage interface 228, and the storage unit 230 store the received digital data, output the stored data, and reproduce the same data. Upon receiving a control signal from the controller 218, the DVR controller 224 stores the routed MPEG TS of the demultiplexer 210, or reproduces video, audio, and system data selected from the stored data. The contents encryptor 226 performs encryption of data to be stored, and outputs the encrypted data. Otherwise, the contents encryptor 226 performs decryption of the encrypted data, and outputs the decrypted data. The contents encryptor 226 may not be used according to implementation examples. The storage interface 228 transmits/receives data to/from the storage unit 230, such that it acts as a data I/O interface with the storage unit 230. The storage unit 230 stores the received data.

DCAS unit 222 downloads the conditional access system (CAS) from the transmission-end server, and stores the downloaded CAS. The DCAS unit 224 performs the conditional access (CA) function according to an appropriate CA system from among the stored CA systems. The controller 218 controls an interface between the host and the security card and the data processing function of the above host.

Figure 8:
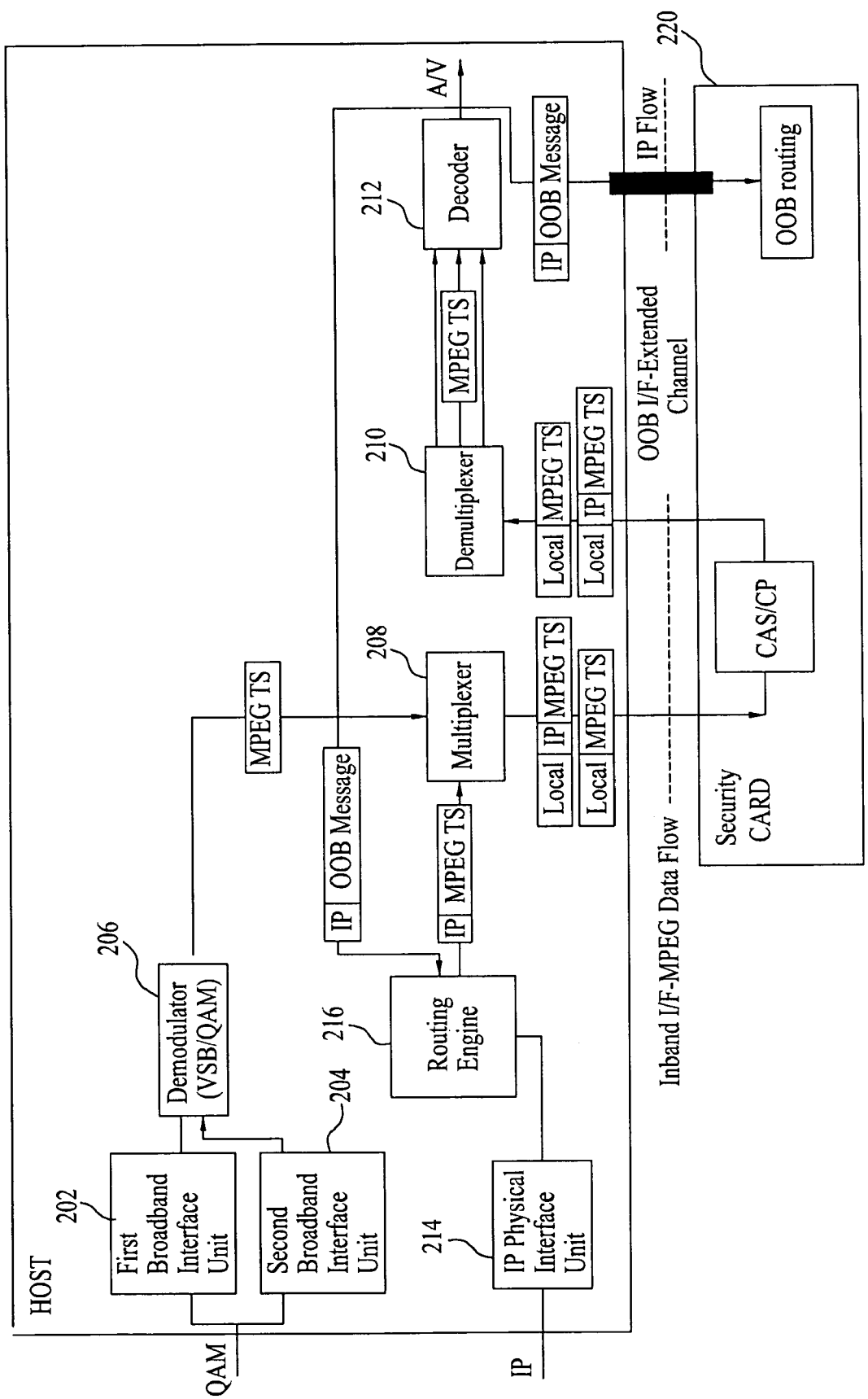
FIG. 8 shows a data flow of the receiver according to one embodiment of the present invention.

FIG. 8 shows a data flow of the receiver according to one embodiment of the present invention. The receiver of FIG. 8 is equal to the receiver of FIG. 2. For the convenience of description, it should be noted that the data flow of FIG. 8 is based on the flow of Rx data of the IP network channel and Rx data of the cable broadcast channel, and other blocks will herein be omitted. It is assumed that MPEG-encoded data has been received in the receiver of FIG. 8.

As described above, cable broadcast data can be received via the first broadband interface unit 202 and the second broadband interface unit 204. The received data is QAM-demodulated by the demodulator 206, such that the demodulated data is applied to the multiplexer 208. The output data of the multiplexer 208 has an MPEG-TS format.

IP network channel data is received via the IP physical interface unit (NIC) 214, and the received data is routed to a corresponding destination by the routing engine 216. The routing engine 216 of FIG. 8 shows only the Ethernet layer, the IP layer, and the TCP/UDP layer from among the network stack. The routing engine 216 divides the Rx data into Inband data and OOB data. The OOB data is transmitted to the security card, and the Inband data is transmitted to the multiplexer 208. The transmitted OOB or Inband data is IP packet-format data which includes the IP header, the UDP header (or TCP header) and the payload. In the case of the OOB data, the payload includes the OOB message data. In the case of the Inband data, the payload includes the MPEG TS.

The multiplexer 208 adds the pre-header of 12 bytes to the MPEG-TS data received from the demodulator 206, adds the pre-header of 12 bytes to the IP packet-format data received from the routing engine 216, and transmits the resultant data to the security card. 'Local' of FIG. 8 is indicative of the pre-header added by the multiplexer 208. As described above, the packet in which the pre-header is added to the MPEG-TS is determined to be the CMP. The other packet in which the pre-header is added to the IP packet is determined to be the IMP.

A data channel and an extended channel are located between the security card and the host. The data channel allows control signals to be communicated between the host and the security card. The extended channel allows actual or real data to be communicated between the host and the security card. The data channel and the extended channel are defined to implement data communication between the host and the security card, such that they serve as a CPU interface. In other words, the security card communicates with the transmission end, analyzes a command received from the transmission end, and communicates with the host via the data- and extended-channels, such that the command instructed by the transmission end can be carried out or the user-entry contents can be transmitted to the transmission end.

In this case, in order to transmit data over the extended channel, a transmission path corresponding to a predetermined data type between the security card and the host must be established. This transmission path is called a 'Flow'. For example, in order to transmit MPEG section data, the MPEG section flow must be established between the security card and the host. After the MPEG section flow has been established between the security card and the host, real MPEG section data can be transmitted to a corresponding flow. There are a variety of extended-channel flows between the security card and the host, a DOCSIS Settop Gateway (DSG) flow, an IP unicast (IP_U) flow, an IP multicast (IP_M) flow, and an MPEG section flow.

As can be seen from FIG. 8, the OOB message configured in the form of an IP packet can be transmitted to the security card using the IP_U flow or the IP_M flow. Inband data (e.g., CMP or IMP packet) can be communicated between the security card and the host using the MPEG data flow.

The security card 220 descrambles data contained in the payload of the received CMP- or IMP-packet according to a CAS (Conditional Access System) or CP (Content Protection) scheme. The resultant CMP- or IMP-packet including the descrambled data is re-transmitted to the host.

The demultiplexer 210 of the host demultiplexes the received packet, and outputs the demultiplexed packet. For example, the demultiplexer 210 transmits MPEG-TS data contained in the payload of the received CMP- or IMP-packet to the decoder 212. Otherwise, the above data may also be stored in the storage unit 230. The decoder 212 decodes the received A/V data, and outputs the decoded A/V data.

Figure 9:
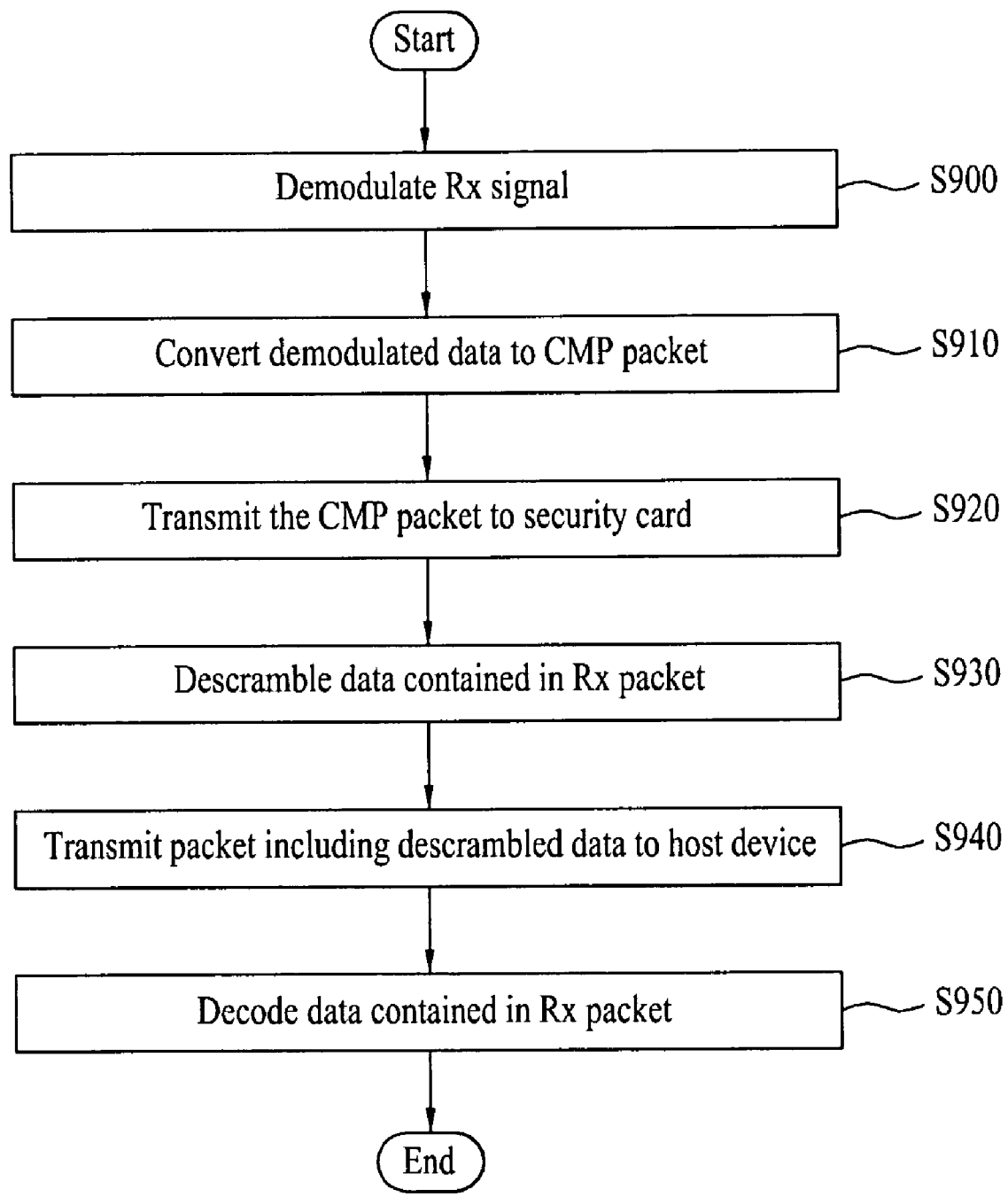
FIGS. 9 and 10 are flow charts illustrating methods for processing reception (Rx) data according to one embodiment of the present invention.
Figure 10:
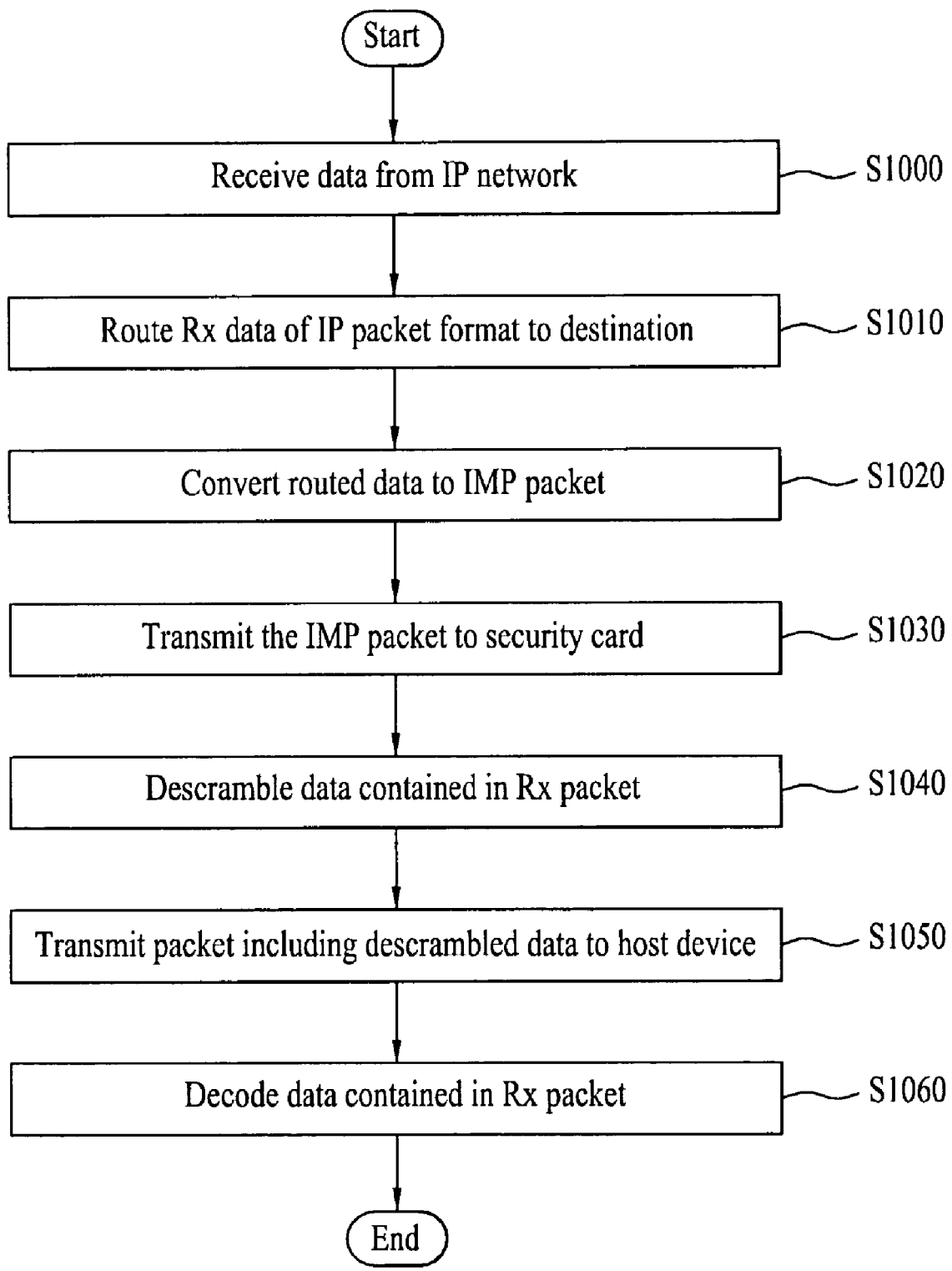

FIGS. 9 and 10 are flow charts illustrating methods for processing reception (Rx) data according to one embodiment of the present invention. If data is received via the cable broadcast channel, FIG. 9 is a flow chart illustrating a method for processing the received data (Rx data). If data is received via the IP network channel, FIG. 10 is a flow chart illustrating a method for processing the received data (Rx data). The above-mentioned receiver may simultaneously perform the process of FIG. 9 and the process of FIG. 10.

Upon receiving signals via the cable broadcast channel, the host demodulates the received signals at step S900. For example, the host may demodulate the above signals according to the QAM scheme. The data demodulated by the QAM scheme may have the MPEG-TS format.

The host adds the pre-header to the above demodulated data, and converts the added result to the CMP (CableCard MPEG Packet) packet at step S910. When the added resultant data is converted into the CMP packet, the host is able to insert the LTSID information for identifying the above data into the pre-header. The CMP packet is transmitted to the security card at step S920. The security card descrambles data contained in the payload of the CMP packet at step S930. The security card descrambles data according to the scrambled scheme of the Rx data, and outputs the descrambled result.

The security card re-transmits the CMP packet including the above descrambled data to the host at step S940. The host receives the CMP packet, removes the pre-header of the packet, and decodes the descrambled data at step S950. Otherwise, the DVR may store the descrambled data according to setup conditions.

Upon receiving signals via the IP network channel, the host can receive the above signals using the network interface card (NIC) at step S1000, such that the received data may have the Ethernet frame format.

The host configures the above Rx data in the form of the IP packet, and routes the resultant IP packet to a corresponding destination at step S1010. The IP packet includes the IP header, the UDP (or TCP) header, or the payload. The above-mentioned routing scheme may be set to any one of a second layer routing, a third layer routing, and a fourth layer routing.

The host adds the pre-header to Rx data of the IP packet format, and converts the added result to the IMP (IP MPEG Packet) packet at step s1020. The terms of the above packets have been disclosed for only illustrative purposes, and it should be noted that the scope and spirit of the present invention is not limited to the above terms, but can also be applied to other examples as necessary. When the above added result is converted into the above IMP packet, the host can insert the LTSID information into the pre-header. The IMP packet is transmitted to the security card at step S1030. The security card descrambles data contained in the payload of the above IMP packet at step S1040. The security card descrambles the above Rx data according to the scrambled scheme, and outputs the descrambled result.

The security card re-transmits the IMP packet equipped with the above descrambled data to the host at step S1050. The host receives the IMP packet, removes the pre-header, the IP header, and the UDP (or TCP) header from the above packet, and decodes the descrambled data at step S1060. For another example, the host may store the above descrambled data without any change according to setup conditions, or may store the IP packet having no pre-header. For still another example, the host may remove the pre-header, the IP header, the UDP (or TCP) header from the MPEG TS, and may store only the remaining MPEG TS therein.

In this case, the security card may use a smart card instead of the cable card.

According to this embodiment of the present invention, a descramble module is contained in the security card or the smart card. The card is detachably connected to the host. The Rx broadcast signal is descrambled by the descramble module of the card, and the descrambled result is provided to the user. However, according to some embodiments of the present invention, the host may include a descramble module without the card. The descramble module may be modified to be downloaded from a broadcast station or a service provider. In other words, the downloaded descramble module may be modified to be stored in a predetermined memory contained in the host. However, the above-mentioned structures have been disclosed for only illustrative purposes, and it should be noted that the above-mentioned structural difference does not limit the spirit or scope of the present invention and can also be implemented with other examples as necessary.

As apparent from the above description, the present invention can perform content protection using the conditional access provided from the conventional cable card. Therefore, the service provider or the service enterpriser can perform the above content protection, and can stably charges a usage fee to a service user using the conditional access.

The present invention processes broadcast data received from all the transfer protocols including both the wired/wireless network and the IP protocol, such that it interfaces with the opencable security card. A service subscriber or a service user minimally changes or extends a function of the conventional cable security card, such that the subscriber or user is able to view data of a desired service provider.

The present invention allows Inband data, transmitted on all the transfer protocols including the wired/wireless network and the IP protocol, to maintain the IP packet format, such that IP-packet format Inband data is transmitted to the security card. As a result, the host can effectively communicate with the security card.

The present invention maintains the interface of the Inband interface of the conventional opencable card, such that it can support both the Inband data received over the Internet or other Inband data received over other Inband channels. As a result, the present invention can acquire a backward compatibility with a conventional system.

The present invention can receive broadcast data from a multimedia over Coax Alliance (MoCA), such that an seamless. IP-based connectivity can be implemented on a coaxial network, resulting in the implementation of an IP over Coax.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of processing broadcast data in a host device interfacing with a point of deployment (POD), the method comprising:

receiving an Ethernet frame including an internet protocol (IP) packet which carries a first moving picture experts group (MPEG) transport stream (TS) packet through an IP network and a cable broadcast signal carrying a second MPEG TS packet through a cable;

demodulating the cable broadcast signal;

routing the IP packet based on destination information included in the Ethernet frame;

extracting the first MPEG TS packet from the IP packet;

generating a CableCARD MPEG Packet (CMP) by appending a packet header carrying identification information to the first and second MPEG TS packet, respectively, wherein the identification information is a local transport stream identifier (LTSID) and is based on an IP address included in the IP packet;

multiplexing the generated CMPs and sending the multiplexed CMPs to the POD;

receiving CMPs from the POD; and demultiplexing the received CMPs for routing the demultplexed CMPs.

2. The method of claim 1, further comprises: removing the appended packet header of the CMPs received from the POD.

3. The method of claim 1, wherein the MPEG TS and second MPEG TS packet carries at least one of video, audio and service information.

4. The method of claim 1, wherein the Ethernet frame further includes an Ethernet header and an Ethernet cyclic redundancy check (CRC).

5. The method of claim 4, wherein the step of extracting the first MPEG TS packet from the Ethernet frame comprises:

removing the Ethernet header and the Ethernet CRC from the frame.

6. The method of claim 1, wherein generating the CMPs by appending the Packet Header comprises:

determining the identification information with respect to the first and second MPEG TS packet, respectively.

7. A host device interfacing with a point of deployment (POD), the host device comprising:

an IP physical interface unit configured to receive an Ethernet frame including an internet protocol (IP) packet which delivers a first moving picture experts group (MPEG) transport stream (TS) packet through an IP network;

a broadband interface unit configured to receive a cable broadcast signal including a second MPEG TS packet through a cable;

a demodulator configured to demodulate the cable broadcast signal;

a routing engine configured to route the IP packet based on destination information included in the Ethernet frame;

a decapsulator configured to extract the first MPEG TS packet from the IP packet;

a multiplexer configured to generate a CableCARD MPEG Packet (CMP) by appending a packet header carrying identification information to the first and the second MPEG TS packet, respectively, multiplex the generated CMPs, and send the multiplexed CMPs to the POD, wherein the multiplexer determines the identification information based on an IP address included in the IP packet, and the identification information is a local transport stream identifier (LTSID); and a demultiplexer configured to demultiplex CMPs received from the POD for routing the demultplexed CMPs.

8. The host device of claim 7, wherein the Ethernet frame further includes an Ethernet header and an Ethernet cyclic redundancy check (CRC).

9. The host device of claim 8, wherein the routing engine removes the Ethernet header and the Ethernet CRC from the frame.

10. The host device of claim 7, wherein the multiplexer determines the identification information with respect to the first MPEG TS packet.

11. The host device of claim 7, wherein the first and second MPEG TS packet carries at least one of video, audio and service information.

12. The host device of claim 7, wherein the demultiplexer is further configured to receive CMPs from the POD and remove the appended packet header of each CMP received from the POD.

* * * * *